March 10, 1936.  T. M. EDISON  2,033,190
VIBRATORY SYSTEM
Filed Dec. 17, 1934  4 Sheets—Sheet 1
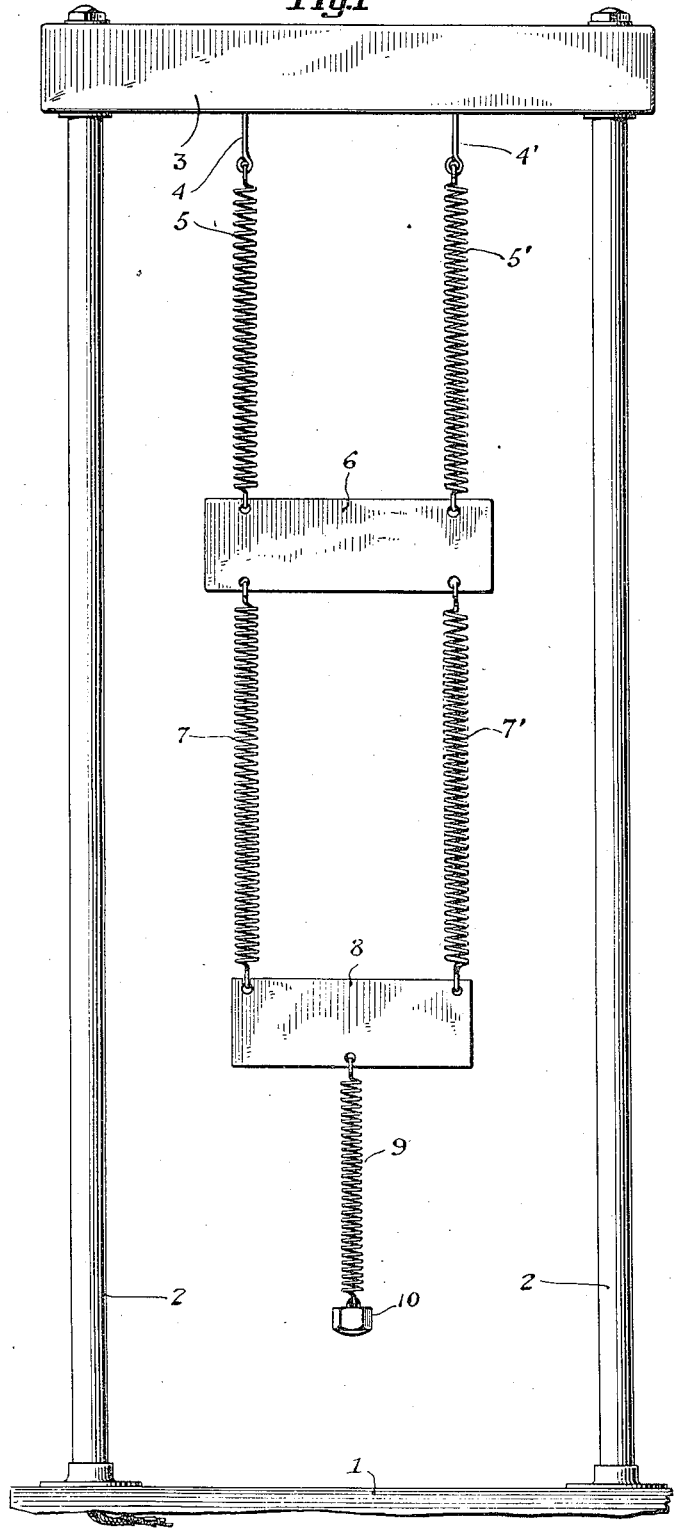
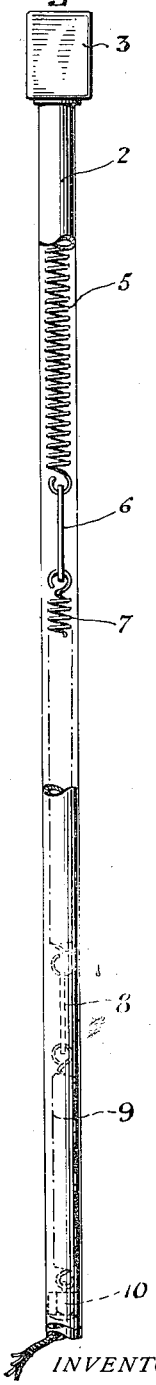
INVENTOR
Theodore M. Edison March 10, 1936.　　　T. M. EDISON　　　2,033,190
VIBRATORY SYSTEM
Filed Dec. 17, 1934　　　4 Sheets-Sheet 2
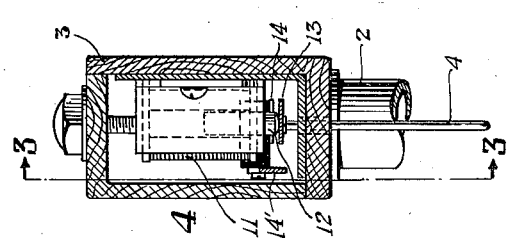
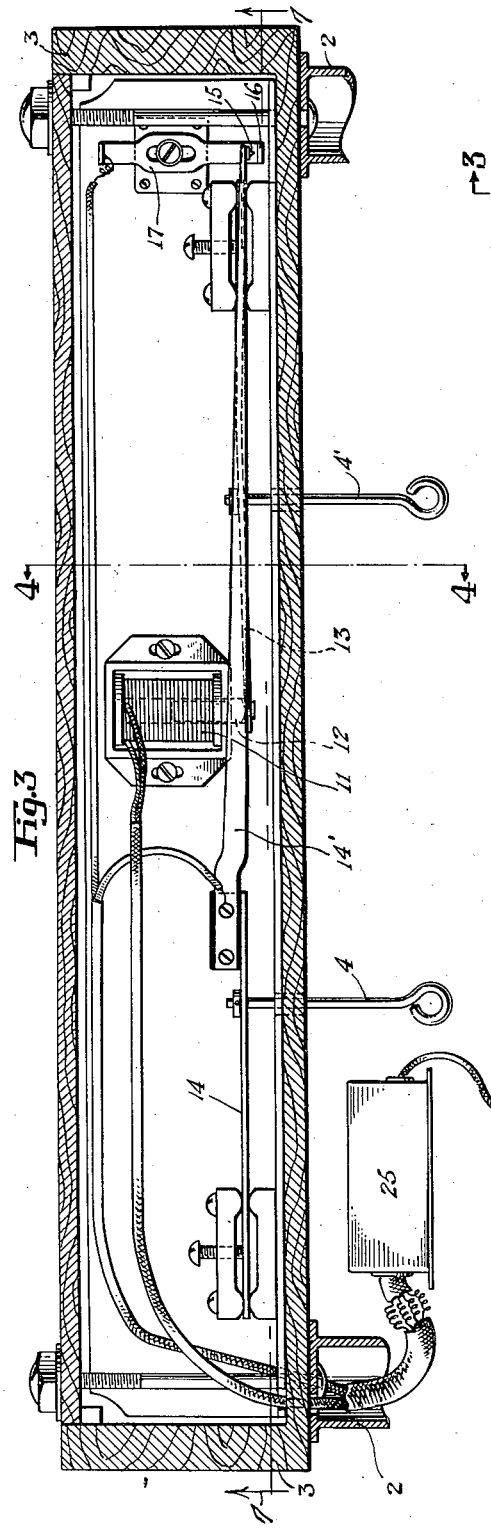
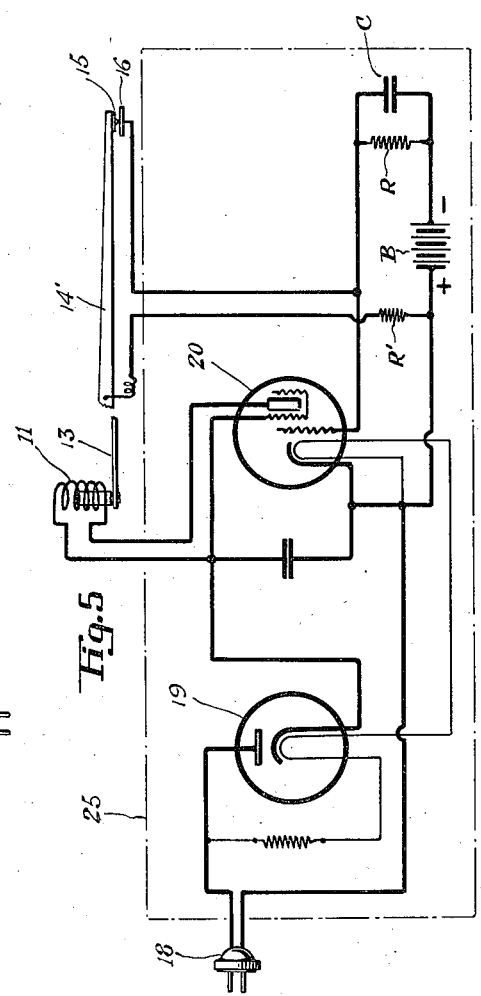
INVENTOR
Theodore M. Edison

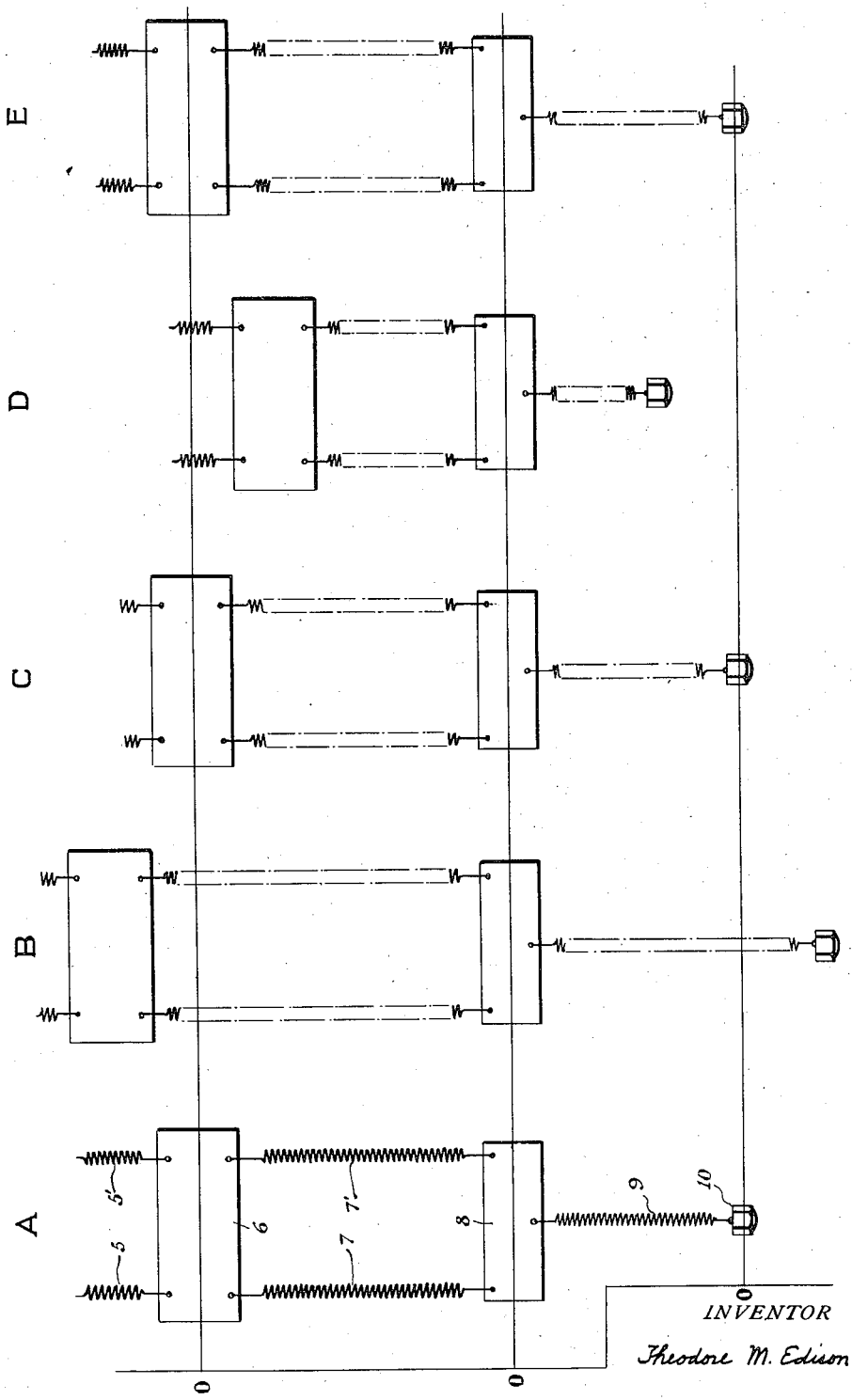

March 10, 1936.  T. M. EDISON  2,033,190
VIBRATORY SYSTEM
Filed Dec. 17, 1934  4 Sheets-Sheet 4
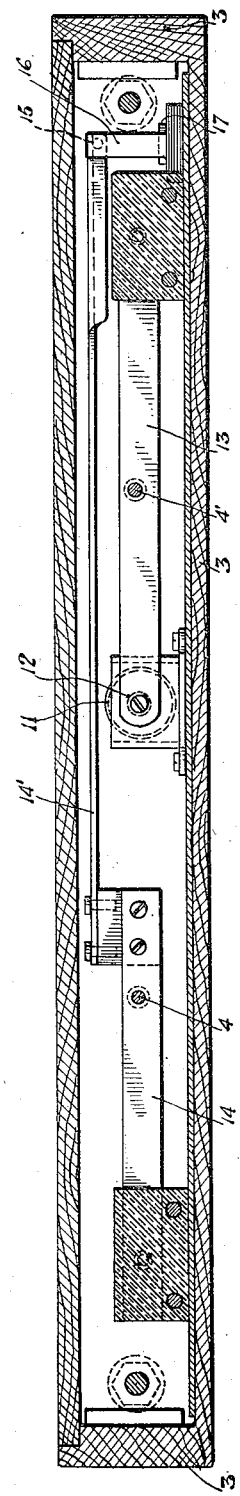
INVENTOR
Theodore M. Edison Patented Mar. 10, 1936

2,033,190

UNITED STATES PATENT OFFICE 2,033,190

VIBRATORY SYSTEM

Theodore M. Edison, West Orange, N. J., assignor to Calibron Products, Incorporated, West Orange, N. J., a corporation of New Jersey Application December 17, 1934, Serial No. 757,870

16 Claims. (Cl. 40—138)

The principal object of this invention is to provide an advertising novelty in which comparatively simple but not generally appreciated resonance phenomena are used for the purpose of attracting attention. Further objects and features of my invention will be described in the following specification and appended claims.

In the embodiment of my invention hereinafter described, I employ a mechanical system comprising three masses and, in effect, three springs so adjusted that, upon proper excitation, the central mass of the group remains almost stationary while the other two masses oscillate with a considerable amplitude. As the apparatus is arranged in such a way that the exciting means is concealed, it is difficult for a layman to understand the activity of the upper and lower masses and the stability of the central mass.

My explanation can be more readily understood by referring to the drawings accompanying and forming part of this specification wherein:

Figure 1 is a front elevational view of one embodiment of my invention.

Fig. 2 is a side view, partly broken away, of the apparatus of Fig. 1.

Fig. 3 is an enlarged front elevational view, partly in section and partly broken away, of the top portion of the apparatus shown in Fig. 1.

Fig. 4 is a sectional view taken approximately on the line 4—4 of Fig. 3.

Fig. 5 is a schematic diagram of an electrical circuit by which periodic excitation of the system is obtained.

Fig. 6 is a series of elevational views showing the positions of some of the parts of the apparatus of Fig. 1 at intervals through one cycle of operation.

Fig. 7 is a sectional view taken approximately on the line 7—7 of Figure 3.

Referring to the drawings, the apparatus is mounted upon a base 1 to which a pair of upright standards 2 are secured. The upright standards are joined by a hollow top frame 3. Projecting from the top frame are a pair of eye bolts 4 and 4' which support the mechanical vibrating system comprising springs 5, 5', 7, 7' and 9 and masses 6, 8 and 10 of any suitable shape. The masses 6 and 8 are here shown in the form of flat plates which may carry printed matter or drawings for purposes of advertising. The springs 5 and 5', although acting effectively as a single spring with respect to desired vertical motions of mass 6, are separated and wound right-hand and left-hand to reduce torsional motions of the masses 6 and 8. The same is true of springs 7 and 7'.

The masses 6 and 10 and the constants of springs 5, 5', 7, 7' and 9 are so proportioned that one natural mode of oscillation exists in which the plate 8 remains almost stationary while the plate 6 and the weight 10 oscillate with considerable amplitude. By setting up the differential equations of this system and assuming that the movement of the mass 8 is and remains zero, the following ideal requirements and results are found:

(1) The value of the mass 6 divided by the sum of the spring constants of the springs 5, 5', 7 and 7' must be equal to the value of the mass 10 divided by the spring constant of spring 9.

(2) The ratio of the amplitude of movement of the mass 10 to the amplitude of movement of the mass 6 will be equal to the ratio of the sum of the spring constants of the springs 7 and 7' to the spring constant of the spring 9.

(3) The frequency of oscillation of the masses 10 and 6 will be equal and will have the value of $$\frac{1}{2\pi}\sqrt{\frac{S_9}{M_{10}}},$$

where $S_9$ represents the spring constant of spring 9 and $M_{10}$ the mass of weight 10.

(4) The motion of the mass 10 will be 180° out of phase with the motion of mass 6. The forces applied to mass 8 will therefore be equal and opposite at all times and no motion will occur.

As an example of the values which have been used in a system of this character, the following figures are given:

Spring Constants: Springs 5 and 5', 35,000 dynes per centimeter each
Springs 7 and 7', 17,000 dynes per centimeter each
Spring 9, 26,000 dynes per centimeter Masses: Mass 6, 600 grams
Mass 8, 320 grams
Mass 10, 150 grams When the system outlined above is started in the motion described, it continues to move in the same mode, but the amplitude of the oscillations gradually dies away as energy is dissipated by air resistance and internal losses.

It might appear that the diminution in amplitude could be overcome easily by exciting the mechanism from some independent source which had a period corresponding to the desired resonant frequency of the masses and springs. However, I have found this to be impractical, as the resonant frequency of the system seems to vary with the amplitude of motion. If the exciting force is made to have a frequency corresponding to the resonant frequency for large amplitudes, the system is unstable. Any disturbance which causes a slight reduction in amplitude detunes the system sufficiently to cause a further decrease in amplitude and, as a result of this cumulative process, the motion eventually reaches a relatively small value. For this reason, an exciting force having constant or independently determined frequency will produce highly unstable and unsatisfactory results. In the structure to be described, the frequency of the exciting force is determined by the vibrating system itself, with the result that the system is free to take up its natural mode of vibration. Thus, it will tend to oscillate at its resonant frequency and will always be supplied with impulses having exactly the same frequency as its oscillation.

While it is important to maintain the frequency relationship outlined above, it is no less important to control the phase angle between the motion of mass 6 and the exciting impulses. If the forces which are applied to the masses are exactly in phase or 180° out of phase with the motions of the masses, they only serve to augment or decrease the spring constants of the system. The energy which is most effective in compensating for the losses of the system is supplied by impulses which are roughly 90° out of phase with the motions of the masses. It is rather difficult to obtain this type of impulse with ordinary driving mechanisms. Because of this, a time delay relay is included in the exciting means, which will now be described in detail.

I provide a solenoid 11 having an armature 12 carried by a cantilever spring 13. The eye bolt 4' is also carried by this spring. The other eye bolt 4 is carried by a similar cantilever spring 14 to which is secured a long arm 14' carrying at its outer end a contact 15 arranged to coact with another contact 16 on the adjustable member 17. The eye bolts 4 and 4' pass through clearance holes in the top frame 3, so that the external and internal springs all form part of the same system. A vertical oscillation of the mass 6 will cause variations in the tensions of springs 5 and 5' which, in turn, will produce oscillations of the springs 13 and 14.

Evidently member 17 may be set so that motions of the arm 14' open and close an electric circuit through contacts 15 and 16. If these contacts were connected in series with the solenoid 11 and a battery, the solenoid would be energized each time the mass 6 went below some predetermined level. In this way, periodic impulses would be given to the resonant system through eye bolt 4', but they would be almost exactly 180° out of phase with the motions of the mass 6. As already pointed out, this would be a highly inefficient way of exciting the system. To improve the efficiency, I provide the time delay relay shown in Fig. 5, by means of which it is possible to approximate the desired phase relationship between solenoid impulses and motions of the mass 6.

The circuit of the relay comprises a pair of vacuum tubes 19 and 20, of which tube 19 is of the two-element type and is used as a rectifier and tube 20 is of the multiple-element type. The solenoid is connected in the plate circuit of this latter tube and is energized by the plate current thereof. The rectifier 19 is not an essential part of the relay but is included to enable the device to operate on either alternating or direct current. Power is supplied through the plug 18, which is adapted to fit the ordinary base plug receptacles of 110 volt electric lighting circuits. If direct current is used, it may sometimes be necessary to reverse the plug 18 in order to obtain the correct polarity in the circuits. Power supply devices are too well known to require further description here.

The solenoid 11 is connected in the plate circuit of the vacuum tube 20, while the grid circuit of this tube comprises a resistance R, a condenser C, and a biasing battery B. The voltage of the battery is sufficiently great to give the grid, in the absence of any other influences, a high negative potential. This prevents the normal flow of electrons to the plate circuit, so that the plate current falls to a very low value. Shunted across this circuit is a second resistance R' in series with the contacts 15, 16. The resistance of R' is low enough to form a path (when points 15 and 16 are in contact) by which the excessive negative charge of the grid may leak off rapidly, thus restoring the plate current to its normal value. In the system herein shown, the contacts are closed when the plate 6 is well below its midposition in the cycle. Upon such closure, the high negative charge collected on the grid during the last cycle starts to leak off immediately, so that the plate current begins to rise and a pull is exerted upon the armature 12. The current, and consequently the pull of the solenoid, continues to increase until the contact is broken. While the contacts are closed, there is a current through resistance R which establishes a difference of potential across, and, therefore, a charge upon, condenser C. When the contacts are opened, the charge on condenser C leaks off slowly through resistance R. Thus, the plate current does not immediately drop when the contacts open, since a time interval, determined by the magnitudes of R and C, is required to build up the negative potential on the grid. The plate current gradually diminishes and does not reach its effectively steady value until a predetermined portion of the cycle is completed. By this means an exciting force is obtained which is somewhat out of phase with the motion of mass 6, but which has a frequency determined wholly by that motion.

In order to operate the mechanism, it is necessary only to insert the plug 18 in the proper socket and to give masses 6 and 10 suitable initial impulses in opposite directions. The first oscillation will close the contacts 15 and 16 and start the periodic excitation which will cause the apparatus to operate indefinitely in the manner indicated in Fig. 6, wherein successive letters denote the successive positions of the parts during a single cycle.

In order to cause the device to attract attention the method of applying the exciting force should not be apparent. When impulses are properly phased with respect to the movement of the masses, the required motion of the eye bolt 4' is extremely small and the springs supporting the eye bolts can be made relatively stiff. Furthermore, the top frame 3 is made in the form of a hollow box in which all of the apparatus for supplying mechanical impulses to the system may be hidden. The vacuum tube unit is contained in a small box 25 which may be placed at some distance from the actual apparatus or under the base. The wiring to this vacuum tube unit is carried through one of the standards 2.

While I have described a particular embodiment of my invention, it will be evident to one skilled in the art that the theory which has been developed applies equally well to far more complex systems. Networks of springs and masses may be made to have the characteristics of the specific device discussed by proportioning the constants of the springs and the masses in such a way that certain of the masses are located at the nodes of the system for certain modes of oscillation. In general, these resonant networks may be excited equally well at a number of different points but, in any case, the most reliable and spectacular results will be obtained only when the frequency of the exciting impulses is determined by the motions of the masses themselves and the phase relationship between the impulses and the motions of the masses is controlled by a suitable timing means.

Because the devices outlined above are self exciting, it is usually possible for them to sustain oscillations in more than one mode. In some of these modes, none of the masses may be at a node of the system. While the effect is then usually less spectacular, it is still interesting and the theory developed in regard to the exciting means still applies. It is not impossible to make a system oscillate in two different modes at the same time by proper modification of the exciting means.

The mode of oscillation which will be sustained by the system described in detail in this specification is determined by the way in which the masses are put in motion. Since the several resonant frequencies differ considerably, there is little difficulty in obtaining a desired type of operation—especially as the time constants of the relay may be selected to favor that particular type.

It is evident that many forms of time delaying means may be substituted for the relay described herein without departing from the spirit of the invention. For example, the electric circuit might be controlled by photo-electric cells through the periodic interception of beams of light by the moving plates, instead of using the intermittent contact between the points 15 and 16 (Fig. 5) for this purpose. Time delay mechanisms which are entirely mechanical may also be substituted for the electro-mechanical relay shown.

Having thus described my invention, I claim:

1. In a device of the class described, a central mass, a plurality of secondary masses, a plurality of springs supporting and mutually coupling all said masses to form a vibratory system, said masses and springs being so proportioned that the system has one natural mode of vibration wherein said central mass remains substantially stationary while the masses disposed on either side thereof vibrate with relatively large amplitudes, and means to supply energy intermittently to the system at a predetermined portion of the cycle.

2. In a device of the class described, a plurality of masses, a plurality of springs connecting and comprising the sole support for said masses to form a vibratory system, said masses and springs being so proportioned that the system has one natural mode of vibration wherein one of said masses remains substantially stationary while the masses disposed on either side thereof vibrate with large amplitudes, and means to supply energy periodically to said system at a frequency determined by said system.

3. In a device of the class described, a plurality of masses, a plurality of springs supporting and connecting said masses to form a vibratory system, said masses and springs being so proportioned that the system has one natural mode of vibration wherein one of said masses remains substantially stationary while the masses disposed on either side thereof vibrate with relatively large amplitudes, means to apply a force to said system, and a control device for said means actuatable by said system when one of said masses occupies a predetermined position.

4. In a device of the class described, a plurality of masses, a plurality of springs supporting and connecting said masses to form a vibratory system, and means controlled by said system to supply pulses to at least one of said springs in synchronism with the movement of one of said masses.

5. In a device of the class described, a plurality of masses, a plurality of springs supporting and connecting said masses to form a vibratory system, means cooperating with at least one of said springs, for applying a force thereto, and a control device for said means, said device being actuatable by said system when one of said masses occupies a predetermined position.

6. In a device of the class described, a plurality of masses and springs forming a vibratory system, an electromagnet adapted to apply impulses to said system through one of said springs, contacts for controlling the energization of said electromagnet, said contacts being operable by a portion of said system in its movement.

7. A vibratory system comprising a plurality of masses and springs, an electromagnet adapted to apply a force to said system, and a circuit including control means actuatable by said system for energizing said electromagnet, said circuit also comprising a time delay device.

8. A vibratory system comprising an element, a pair of masses, a plurality of springs independently joining said masses to said element and supporting said system, the ratios of the respective masses to the sum of the spring constants of their respectively associated springs being equal whereby said system has one natural mode of vibration in which said element remains substantially stationary while said masses vibrate with relatively large amplitudes, and means cooperating with said system for maintaining free vibration at said mode.

9. A vibratory device comprising an element, a plurality of vibratory systems comprising springs and masses spring connected to said element, each of said systems having a common resonant frequency, whereby when at least one of said systems is excited at said resonant frequency said element remains substantially stationary while the masses of said vibratory systems oscillate with relatively large amplitudes, and means cooperating with at least one of said systems to supply pulses thereto in synchronism with the movement thereof.

10. A plurality of masses, a plurality of springs supporting and connecting said masses to form a vibratory system, and movable means adapted to excite said system at the frequency of at least one natural mode of vibration, the amplitude of movement of said means being less than the amplitude of movement of at least one of said masses when so excited.

11. A vibratory device comprising a movable element, a plurality of vibratory systems having a common resonant frequency and comprising springs and masses spring connected to said element, and means to supply impulses to at least one of said systems at a frequency determined by said system.

12. A vibratory device comprising a movable element, a plurality of vibratory systems having a common resonant frequency and comprising springs and masses spring connected to said element, means to supply impulses to at least one of said systems in synchronism with the movement thereof, and means cooperative with said first named means to control the phase of said impulses relative to said movement.

13. A vibratory device comprising a movable element, a plurality of vibratory systems having a common resonant frequency and comprising springs and masses spring connected to said element, means to supply impulses to at least one of said systems in synchronism with the movement thereof, and phase retarding means cooperative with said impulse supplying means.

14. A vibratory device comprising a movable element, a plurality of vibratory systems having a common resonant frequency and comprising springs and masses spring connected to said element, means to supply impulses to at least one of said systems, and a control device for said means actuatable by at least one of said systems at a predetermined portion of its cycle.

15. In a device of the class described, a plurality of masses, a plurality of springs supporting and connecting said masses to form a vibratory system, said masses and springs being so proportioned that the system has one natural mode of vibration wherein one of said masses remains substantially stationary while the masses disposed on either side thereof vibrate with relatively large amplitude, means to excite said system at the frequency of said mode, and a control device for said means, such control device being actuatable by said system whenever one of said masses occupies a predetermined position.

16. In a device of the class described, a central mass, a plurality of secondary masses, a plurality of springs supporting and mutually coupling all said masses to form a vibratory system, said masses being so proportioned that the system has one natural mode of vibration wherein said central mass remains substantially stationary while the masses disposed on either side thereof vibrate with large amplitudes, and means cooperating with said system to supply energy periodically to it at the frequency of said mode.

THEODORE M. EDISON.